Feb. 26, 1924.
S. A. TUTTLE ET AL
1,485,097
WINDSHIELD WIPER FOR AUTOMOBILES
Filed Feb. 17, 1923
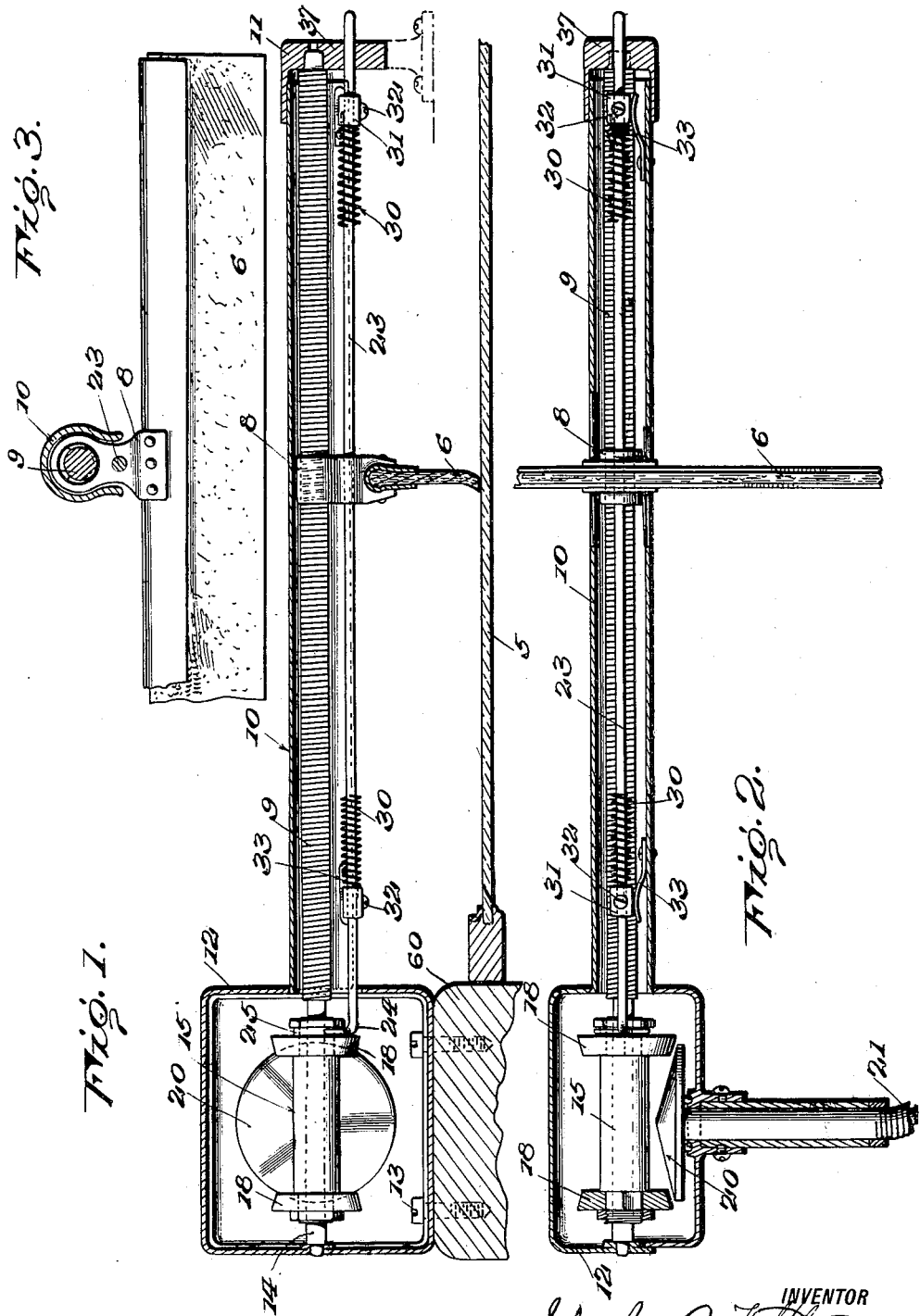
INVENTOR
Stanley C. Tuttle
Harry L. Parker Patented Feb. 26, 1924.

1,485,097

UNITED STATES PATENT OFFICE.

STANLEY A. TUTTLE AND HARRY L. PARKER, OF OAKWOOD, MICHIGAN.

WINDSHIELD WIPER FOR AUTOMOBILES.

Application filed February 17, 1923. Serial No. 619,584.

*To all whom it may concern:*

Be it known that we, STANLEY A. TUTTLE and HARRY L. PARKER, citizens of the United States, residing at Oakwood, in the county of Wayne and State of Michigan, have invented certain new and useful Improvements in Windshield Wipers for Automobiles, of which the following is a specification.

This invention relates to windshield wipers for automobiles.

An important object is to provide a windshield wiper having novel means whereby the wiping element is reversed in its direction of travel upon reaching one end of the windshield.

A further object is to provide a windshield wiper which may be operatively connected to any convenient part of the vehicle or its engine and which requires no attention on the part of the vehicle operator.

A further object is to provide a windshield wiper which is reliable in use, of highly simplified construction, and cheap to manufacture.

Other objects and advantages of this invention will be apparent during the course of the following description.

In the accompanying drawings forming a part of this application and in which like numerals are employed to designate like parts throughout the same, Figure 1 is a horizontal sectional view through the improved windshield wiper.

Figure 2 is a vertical longitudinal sectional view through the same.

Figure 3 is a detail transverse sectional view.

In the drawing wherein for the purpose of illustration is shown a preferred embodiment of the invention the numeral 5 generally designates the windshield of a motor vehicle or the like, the said windshield being arranged within the usual frame 60.

The invention forming the subject matter of this application resides in providing novel means whereby the wiper 6 may be moved back and forth across the windshield for removing the rain and snow from the windshield. As illustrated particularly in Figure 2 the wiper 6 is connected intermediate its ends to a feed nut 8 mounted on a feed screw 9 arranged within a housing 10 extended across the windshield and connected at one end to a bracket 11 and at its other end to a casing 12. The casing 12 may be secured to the windshield frame 6 or other convenient support in any suitable manner as by fastening devices 13.

The feed screw 9 has a squared shank 14 rotatably extended through the casing 12 and slidably supporting a sleeve 15 having a squared bore whereby the rotation of the sleeve causes the feed screw 9 to rotate. The ends of the sleeve 15 are provided with friction wheels 18 adapted to be alternately engaged with the surface of a friction disk 20 having connection with a suitable source of power by means of a flexible shaft 21 or the like.

It will be seen that the friction wheels 18 are arranged on opposite sides of the center of the cone shaped friction disk 20 so that they will be caused to rotate in opposite directions. The friction wheels 18 are alternately engaged with the friction disk 20 by means of a longitudinally movable rod 23 having one end forked as indicated at 24 and received within an annular groove 25 in one end of the sleeve 15. It will be seen that when the rod 23 is moved longitudinally the sleeve 15 will also be moved longitudinally for removing one of the wheels 18 from engagement with the disk and engaging the other wheel with the disk whereby the direction of rotation of the feed screw 9 will be reversed.

As the feed nut 8 moves longitudinally on the feed screw, it contacts with one of a pair of coil springs 30 rigidly secured upon the rod 23 by means of sleeves 31 adjustably held in position by means of set screws 32 or the like. The sleeves 31 are held in position by means of longitudinally curved leaf springs 33 carried by the lower wall of the housing and the leaf springs 33 yieldably resist the longitudinal movement of the rod.

However, when the feed screw moves into engagement with one of the coil springs that coil spring is compressed until the tension of the same becomes sufficient to overcome the action of the adjacent leaf spring 33. At this point the rod is moved longitudinally so that the other wheel 18 is engaged with the friction disk 20 whereupon the direction of rotation of the feed screw is reversed. When the sleeve 31 is released from binding engagement with the leaf spring 33 the tension of the coil spring 30 acting against the nut 8 causes the friction wheel 18 to be firmly engaged with the friction disk. The longitudinal movement of the rod 23 is more or less slight so that the leaf springs remain in engagement with the sleeves 31 at all times and the leaf springs therefor act to alternately hold the wheels 18 in engagement with the disk.

One end of the longitudinally movable rod 10 is slidable through a bracket 37 which also rotatably supports the adjacent end of the feed screw. Further, the bracket 37 supports the adjacent end of the housing which, as illustrated in Figure 3, is substantially U-shaped in cross section.

We claim:—

1. A windshield wiper comprising a feed screw having a squared shank, a sleeve mounted on said squared shank and having a pair of friction wheels, a friction disk alternately engaged by said friction wheels, a nut mounted on said feed screw and having a wiper, a longitudinally movable rod having one end forked and connected to said sleeve, a pair of sleeves adjustably mounted on said rod, and coil springs mounted on said rod in engagement with said pair of sleeves, said coil springs being arranged in the path of travel of said nut whereby the endwise movement of the nut alternately compresses the springs and moves the rod longitudinally.

2. A windshield wiper comprising a feed screw having a squared shank, a sleeve mounted on said squared shank and having a pair of friction wheels, a friction disk alternately engaged by said friction wheels, a nut mounted on said feed screw and having a wiper, a longitudinally movable rod having one end forked and connected to said sleeve, a pair of sleeves adjustably mounted on said rod, coil springs mounted on said rod in engagement with said pair of sleeves, said coil springs being arranged in the path of travel of said nut whereby the endwise movement of the nut alternately compresses the springs and moves the rod longitudinally, and longitudinally curved leaf springs contacting with said pair of sleeves whereby to yieldably hold the rod in position.

3. The construction set forth in claim 2, and a housing receiving said feed screw, said nut, and said rod, and constituting a supporting means for said pair of leaf springs.

In testimony whereof we have affixed our signatures in the presence of two witnesses.

STANLEY A. TUTTLE.
HARRY L. PARKER.

Witnesses:
CLARENCE L. HALL,
ULYSSES R. BAILEY.